(12) United States Patent
King et al.

(10) Patent No.: US 10,570,977 B2
(45) Date of Patent: Feb. 25, 2020

(54) ATTACHMENT OF OPPOSED CONICAL ELASTOMERIC BEARINGS

(71) Applicant: The Boeing Company, Chicago, IL (US)

(72) Inventors: Carl R King, Mesa, AZ (US); Robert T. Loftus, Jr., Gilbert, AZ (US)

(73) Assignee: The Boeing Company, Chicago, IL (US)

( * ) Notice: Subject to any disclaimer, the term of this patent is extended or adjusted under 35 U.S.C. 154(b) by 22 days.

(21) Appl. No.: 15/971,558

(22) Filed: May 4, 2018

(65) Prior Publication Data
US 2019/0338821 A1 Nov. 7, 2019

(51) Int. Cl.
*F16F 1/38* (2006.01)
*F16F 1/393* (2006.01)
*B64C 27/48* (2006.01)

(52) U.S. Cl.
CPC .......... *F16F 1/3842* (2013.01); *F16F 1/3935* (2013.01); *B64C 27/48* (2013.01)

(58) Field of Classification Search
CPC ........ F16F 1/3842; F16F 1/3935; B64C 24/48
USPC ................................................ 267/288, 293
See application file for complete search history.

(56) References Cited

U.S. PATENT DOCUMENTS

| | | | | |
|---|---|---|---|---|
| 2,482,488 A | * | 9/1949 | Julien | B61F 5/325 267/33 |
| 3,329,453 A | * | 7/1967 | Patton | F16C 11/08 403/221 |
| 3,989,126 A | * | 11/1976 | Katzer | B61H 5/00 188/206 R |
| 4,680,424 A | * | 7/1987 | Hawkins | H02G 7/14 156/292 |
| 6,860,015 B2 | * | 3/2005 | Muylaert | B64C 27/32 29/898.07 |
| 6,889,965 B2 | | 5/2005 | Loftus et al. | |
| 2003/0068104 A1 | * | 4/2003 | Loftus | B64C 27/32 384/215 |

* cited by examiner

*Primary Examiner* — Thomas J Williams
*Assistant Examiner* — James K Hsiao
(74) *Attorney, Agent, or Firm* — McDonnell Boehnen Hulbert & Berghoff LLP

(57) ABSTRACT

An opposed conical elastomeric bearing assembly includes a first conical elastomeric bearing with a first inner race and a first outer race, and a second conical elastomeric bearing with a second inner race and a second outer race. Assembling the opposed conical elastomeric bearing assembly may include positioning an outer surface of the second outer race in contact with an inner surface of the first outer race. Assembling the opposed conical elastomeric bearing assembly further includes applying an axial force to urge the first conical elastomeric bearing and the second conical elastomeric bearing together such that a leading edge of the second inner race contacts a shoulder of the first inner race, and, while applying the axial force, deforming a projecting portion of the first inner race such that an outer diameter of the projecting portion is expanded to frictionally engage an inner surface of the second inner race.

20 Claims, 6 Drawing Sheets

ATTACHMENT OF OPPOSED CONICAL ELASTOMERIC BEARINGS

FIELD

The present disclosure generally relates to opposed conical elastomeric bearings and methods for attaching opposed conical elastomeric bearings to form an opposed conical elastomeric bearing assembly.

BACKGROUND

Opposed conical elastomeric bearing assemblies are generally capable of carrying large radial loads, which may be useful in a number of mechanical or structural applications. For example, two opposed conical elastomeric bearings may be pre-loaded in an axial direction and then attached together using one or more fasteners to maintain the assembly in the desired configuration. However, the fasteners may add to the overall size of the opposed conical elastomeric bearing assembly, whereas some implementations may call for a bearing that is relatively small in size.

What is needed is an improved way to attach opposed conical elastomeric bearings that reduces or eliminates the need for fasteners, thereby reducing the envelope of the bearing assembly.

SUMMARY

In one example, a method of assembling an opposed conical elastomeric bearing assembly is described, where a first conical elastomeric bearing includes a first inner race and a first outer race, and where a second conical elastomeric bearing includes a second inner race and a second outer race. The method includes positioning the first conical elastomeric bearing in contact with the second conical elastomeric bearing such that an outer surface of the second outer race contacts an inner surface of the first outer race, where the first inner race further includes a projecting portion, the projecting portion including an outer surface having an outer diameter and an inner surface forming a bore through the first conical elastomeric bearing in an axial direction. The method also includes applying an axial force to urge the first conical elastomeric bearing and the second conical elastomeric bearing together. The method also includes positioning the second conical elastomeric bearing in further contact with the first conical elastomeric bearing such that the second inner race surrounds the projecting portion of the first inner race, and such that a leading edge of the second inner race contacts a shoulder of the first inner race. The method also includes, while applying the axial force, deforming the projecting portion of the first inner race such that the outer diameter of the projecting portion is expanded, where the outer surface of the projecting portion is thereby frictionally engaged with an inner surface of the second inner race.

In another example, a method of assembling an opposed conical elastomeric bearing assembly is described, where a first conical elastomeric bearing includes a first inner race and a first outer race, and where a second conical elastomeric bearing includes a second inner race and a second outer race. The method includes positioning the first conical elastomeric bearing in contact with the second conical elastomeric bearing such that an outer surface of the second outer race contacts an inner surface of the first outer race, where the first inner race includes a projecting portion having an outer surface, and where the second inner race includes an inner surface. The method also includes, after positioning the first conical elastomeric bearing in contact with the second conical elastomeric bearing such that the outer surface of the second outer race contacts the inner surface of the first outer race, applying an axial force to urge the first conical elastomeric bearing and the second conical elastomeric bearing together such that an interference fit is formed between the outer surface of the projecting portion of the first inner race and the inner surface of the second inner race.

In another example, an opposed conical elastomeric bearing assembly is described including a first conical elastomeric bearing having a first inner race and a first outer race, where the first inner race and the first outer race are joined by a first elastomeric ring positioned therebetween, and where the first inner race includes a projecting portion having an outer surface and an inner surface, the inner surface forming a bore through the first conical elastomeric bearing in an axial direction. The opposed conical elastomeric bearing assembly also includes a second conical elastomeric bearing having a second inner race and a second outer race, where the second inner race and the second outer race are joined by a second elastomeric ring positioned therebetween, where an inner surface of the first outer race is engaged with an outer surface of the second outer race, and where the outer surface of the projecting portion of the first inner race is frictionally engaged with an inner surface of the second inner race of the second conical elastomeric bearing The features, functions, and advantages that have been discussed can be achieved independently in various examples or may be combined in yet other examples, further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

Disclosed examples will now be described more fully with reference to the accompanying Figures, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Examples discussed herein include opposed conical elastomeric bearings and methods for attaching them to form an opposed conical elastomeric bearing assembly. The assembly may include a first conical elastomeric bearing that is frictionally engaged with a second conical elastomeric bearing in such a way that reduces or eliminates the need for additional fasteners to hold the opposed conical elastomeric bearings together. This may allow for an assembly of reduced size, among other possible benefits.

By the term "about" or "substantial" and "substantially" or "approximately," with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

Figure 1:
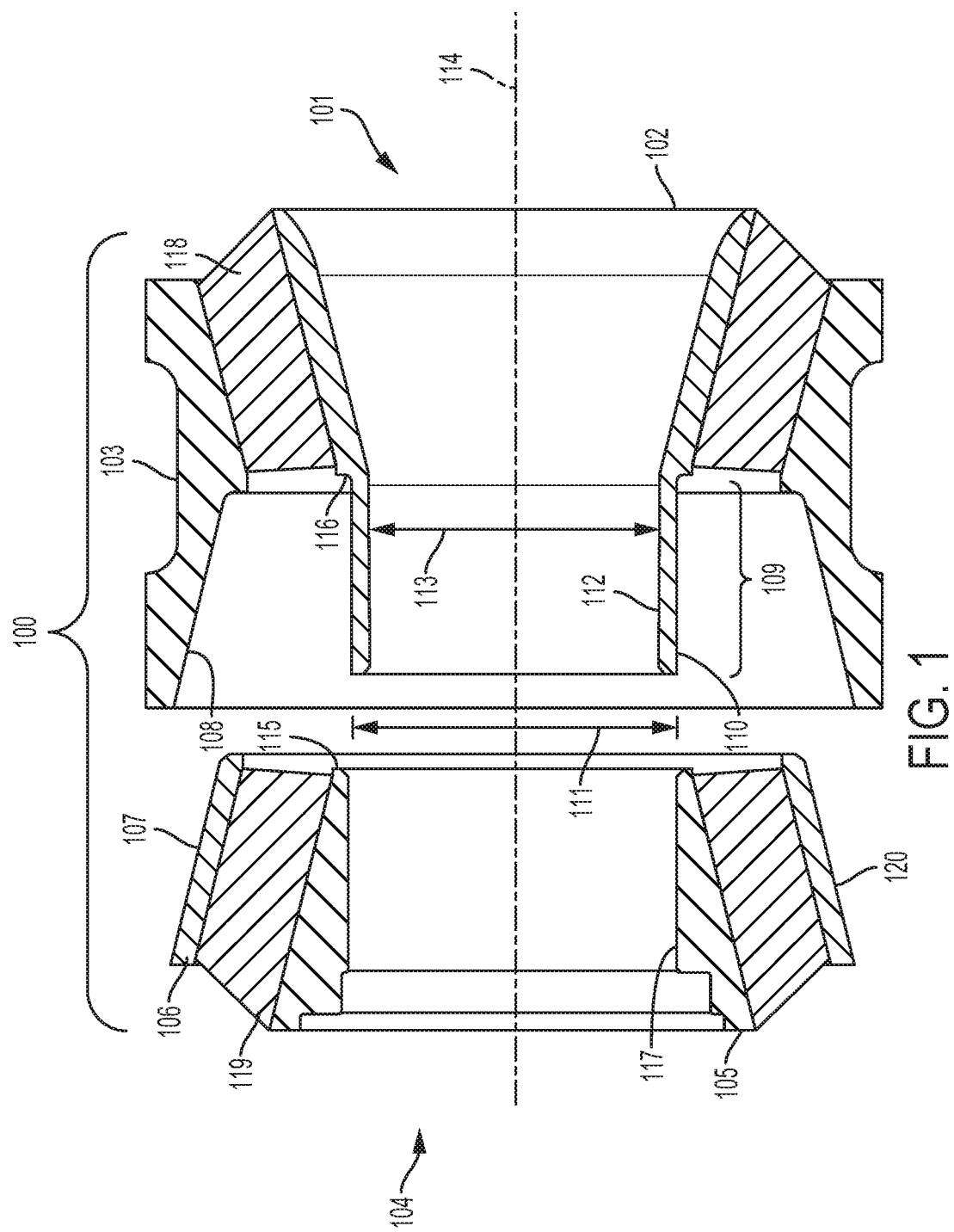
FIG. 1 illustrates an unassembled cross-sectional view of an opposed conical elastomeric bearing assembly, according to an example implementation.
Figure 2:
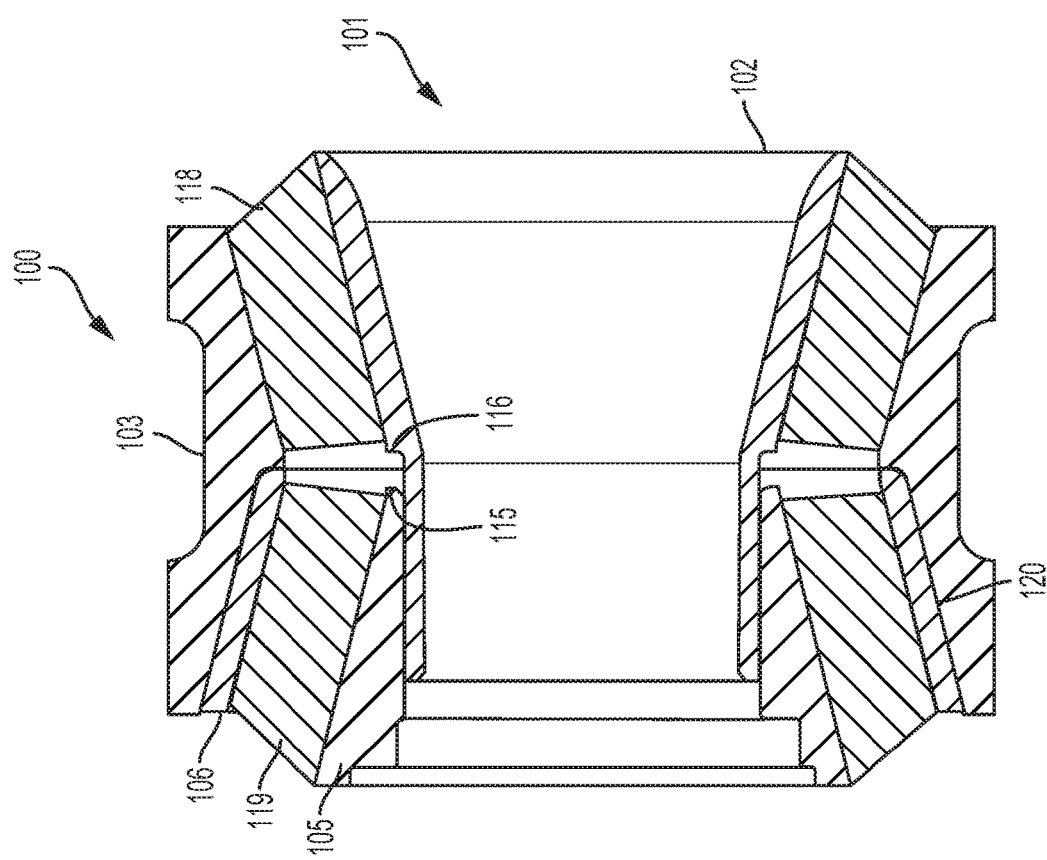
FIG. 2 illustrates a partially assembled cross-sectional view of an opposed conical elastomeric bearing assembly, according to an example implementation.
Figure 3:
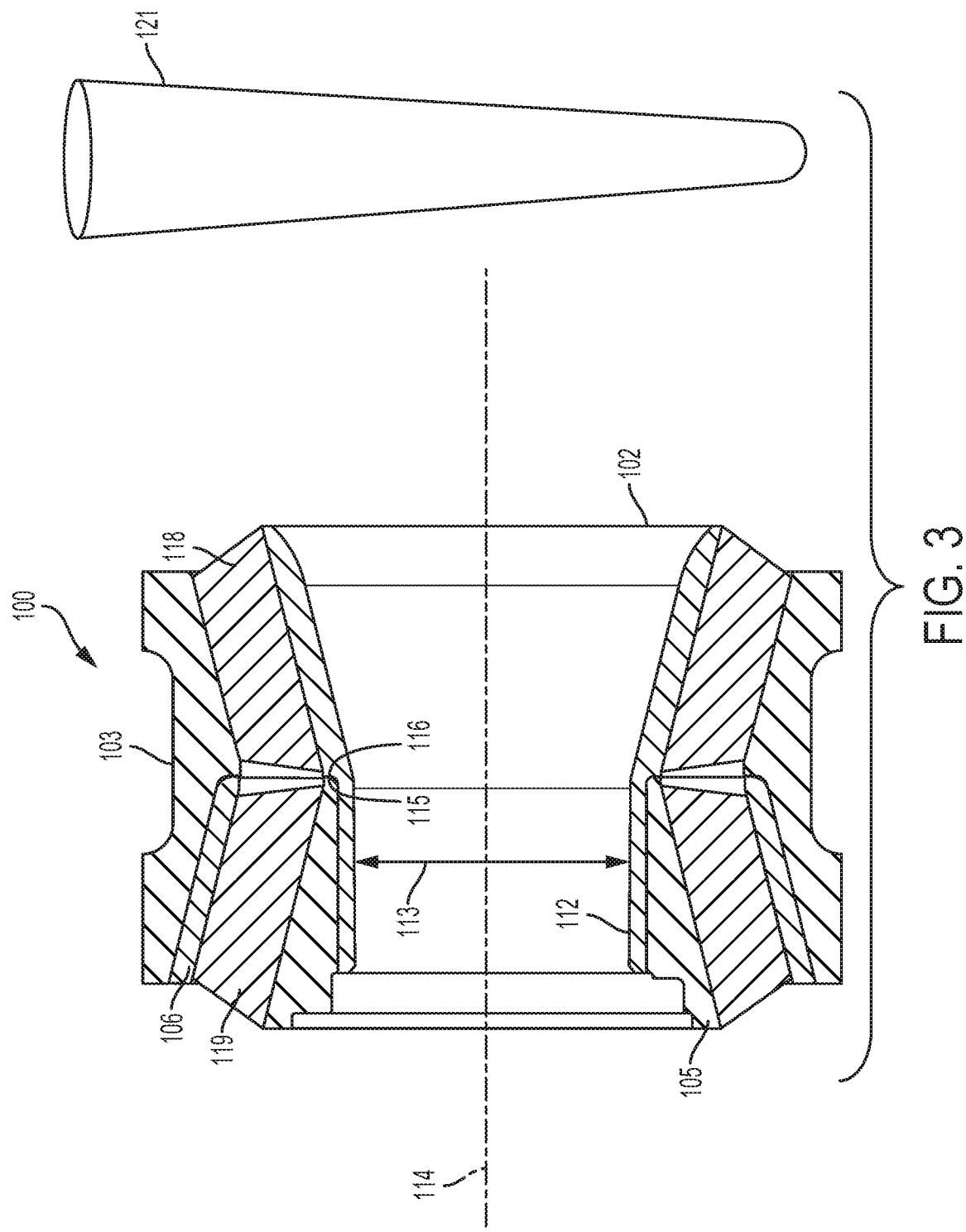
FIG. 3 illustrates a cross-sectional view of an opposed conical elastomeric bearing assembly, according to an example implementation.

Referring now to FIGS. 1-3, an opposed conical elastomeric bearing assembly 100 is shown in various stages of assembly, according to an example implementation. For example, FIG. 1 shows an unassembled cross-sectional view of the conical elastomeric bearing assembly 100, including a first conical elastomeric bearing 101 and a second conical elastomeric bearing 104. The first conical elastomeric bearing 101 includes a first inner race 102 and a first outer race 103 having an inner surface 108. The first inner race 102 and the first outer race 103 are joined by a first elastomeric ring 118 positioned therebetween. The first inner race 102 includes a projecting portion 109 has an outer surface 110 having an outer diameter 111, and an inner surface 112 that forms a bore 113 through the first conical elastomeric bearing 101 in an axial direction 114. The first inner race 102 also includes a shoulder 116 that may be adjacent to the outer surface 110 of the projecting portion 109, as shown in FIG. 1.

The opposed conical elastomeric bearing assembly 100 further includes a second conical elastomeric bearing 104, which includes a second inner race 105 having an inner surface 117, and a second outer race 106 having an outer surface 107. The second inner race 105 and the second outer race 106 may be joined by a second elastomeric ring 119 positioned therebetween, similar to the first conical elastomeric bearing 101. As shown in FIG. 1, the first conical elastomeric bearing 101 and the second conical elastomeric bearing 104 may be arranged for assembly such that their respective conical shapes are pointed toward each other in an opposed configuration.

The second inner race 105 may include a leading edge 115 that is positioned to engage the shoulder 116 of the first inner race 102 when the opposed conical elastomeric bearing assembly 100 is assembled, as discussed further below. In some implementations, an adhesive 120, such as an epoxy, may be added to the outer surface 107 of the second outer race 106 before engaging it with the inner surface 108 of the first outer race 103, as seen in FIG. 2. The adhesive 120 may additionally or alternatively be added to the inner surface 108 of the first outer race 103 before assembly. Other possibilities also exist.

FIG. 2 illustrates a partially assembled cross-sectional view of the opposed conical elastomeric bearing assembly 100, in which the outer surface 107 of the second outer race 106 is engaged with the inner surface 108 of the first outer race 103. As noted above, an adhesive 120 may be used to bond the outer races together. As shown in FIG. 2, the projecting portion 109 of the first inner race 102 is positioned within the second inner race 105, adjacent to the inner surface 117 of the second inner race 105. For example, and as will be discussed further below, the outer surface 110 of the projecting portion 109 may be frictionally engaged with the inner surface 117 of the second inner race 105. However, in FIG. 2, the leading edge 115 of the second inner race 105 is not engaged with the shoulder 116 of the first inner race 102, as will be seen with reference to FIG. 3.

FIG. 3 illustrates a cross-sectional view of the opposed conical elastomeric bearing assembly 100. In FIG. 3, the leading edge 115 of the second inner race 105 has been engaged with the shoulder 116 of the first inner race 102, while the first outer race 103 and the second outer race 106 remained in the same relative positioned as shown in FIG. 2. For instance, an axial force may be applied to urge the inner races together, causing a deformation in both the first elastomeric ring 118 and the second elastomeric ring 119, which can be seen from their changed shape from FIG. 2 to FIG. 3. This axial pre-loading may induce a shear strain in both the first and second elastomeric rings, and may help to reduce or prevent tensile loading of the first elastomeric ring 118 and the second elastomeric ring 119 during operation.

In some implementations, the frictional engagement of the outer surface 110 of the projecting portion 109 and the inner surface 117 of the second inner race 105 may join the first conical elastomeric bearing 101 and the second conical elastomeric bearing 104 together by way of an interference fit between the two bearings. For instance, the difference in the nominal size, or allowance, between the outer surface 110 of the projecting portion 109 and the inner surface 117 of the second inner race 105 may be extremely low, creating a heavy interference fit and requiring a substantial axial force to urge the two bearings together. For example, in some cases, the axial force needed to urge the first conical elastomeric bearing 101 and the second conical elastomeric bearing 104 together may be on the order of 35,000 lbs. or greater.

Additionally or alternatively, the outer surface 110 of the projecting portion 109 of the first conical elastomeric bearing 101 may be frictionally engaged with the inner surface 117 of the second inner race 105 via a radially outward deformation of the outer surface 110 of the projecting portion 109. For instance, after the first conical elastomeric bearing 101 and the second conical elastomeric bearing 104 are urged together in the arrangement shown in FIG. 3, they may be held in place while the projecting portion may be cold-worked such that its outer diameter 111 is increased. For instance, a tapered mandrel 121, as shown in FIG. 3, may be drawn through the bore 113 in order to produce the outward deformation of the outer surface 110 of the projecting portion. In some cases, this may result in the first conical elastomeric bearing 101 and the second conical elastomeric bearing 104 being irreversibly joined via the frictional engagement of the outer surface 110 of the projecting portion 109 with the inner surface 117 of the second inner race 105. Other cold-working applications are also possible, including cold-working a portion of either or both of the first conical elastomeric bearing 101 and the second conical elastomeric bearing 104.

Figure 5:
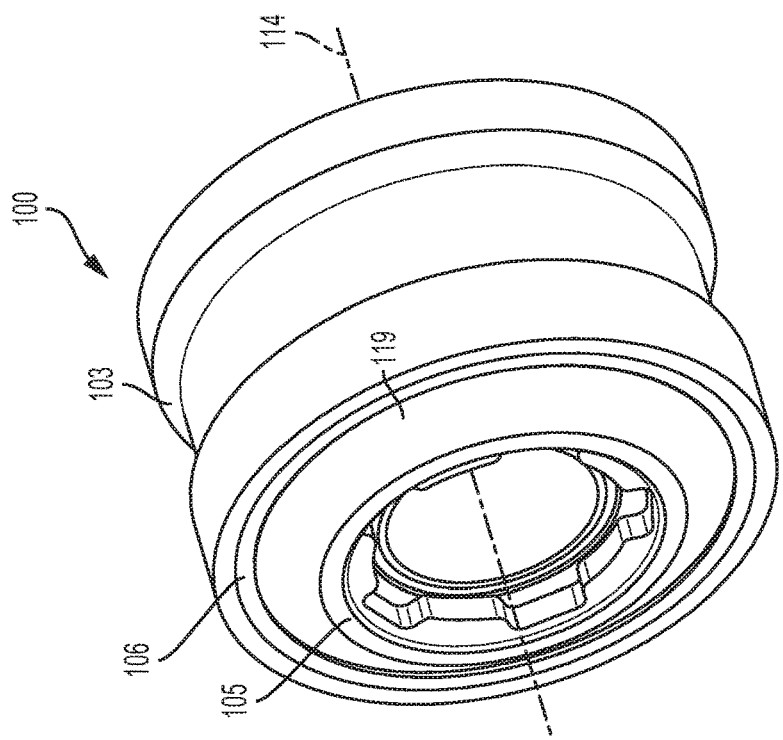
FIG. 5 illustrates a perspective view of an opposed conical elastomeric bearing assembly, according to an example implementation.
Figure 4:
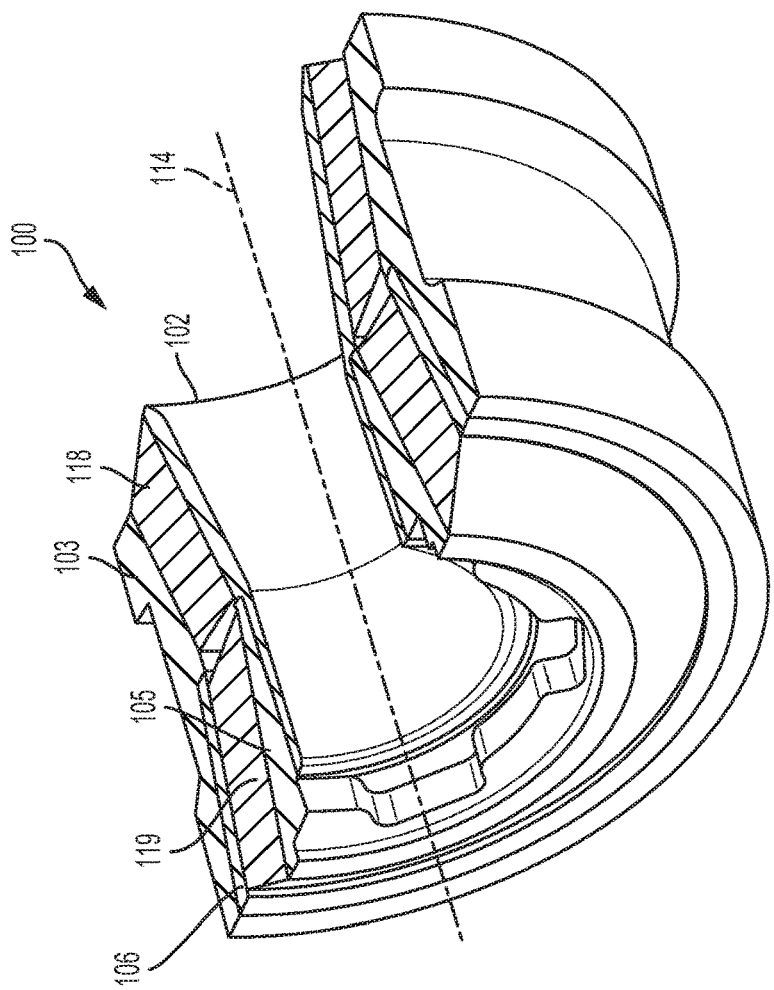
FIG. 4 illustrates a cross-sectional perspective view of an opposed conical elastomeric bearing assembly, according to an example implementation.

FIG. 4 and FIG. 5 show perspective views of the fully assembled opposed conical elastomeric bearing assembly 100, with FIG. 4 showing a cross sectional view through approximately the middle of the assembly. The opposed conical elastomeric bearing assembly 100 as shown in FIGS. 4 and 5 may be used in a number of applications that require a bearing that must carry large radial loads. For instance, the individual blades of a helicopter rotor may be attached to a main rotor hub which, when rotated, produces very high centrifugal loads. Accordingly, each blade may be attached to the main rotor hub via one or more of the opposed conical elastomeric bearing assemblies 100. In such an embodiment, the bore 113 through the first conical elastomeric bearing 101 may have a diameter of 2.12 inches, for example, and the outermost diameter of the first outer race 103 may have a diameter of 2.36 inches, for example. Numerous other uses, implementations, and sizes for the opposed conical elastomeric bearing assembly 100 discussed herein are also possible.

Figure 6:
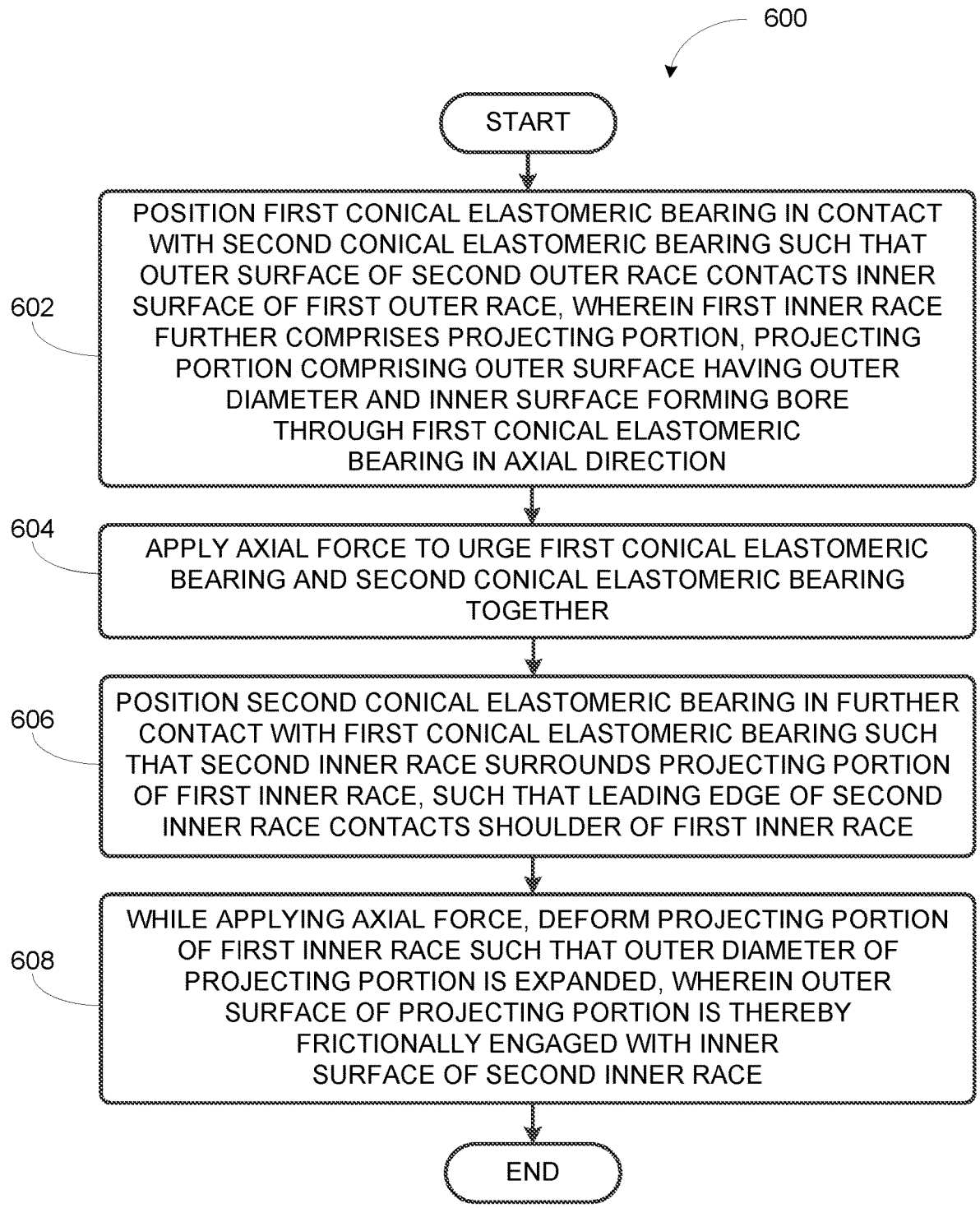
FIG. 6 shows a flowchart of an example method for assembling an opposed conical elastomeric bearing assembly, according to an example implementation.
Figure 7:
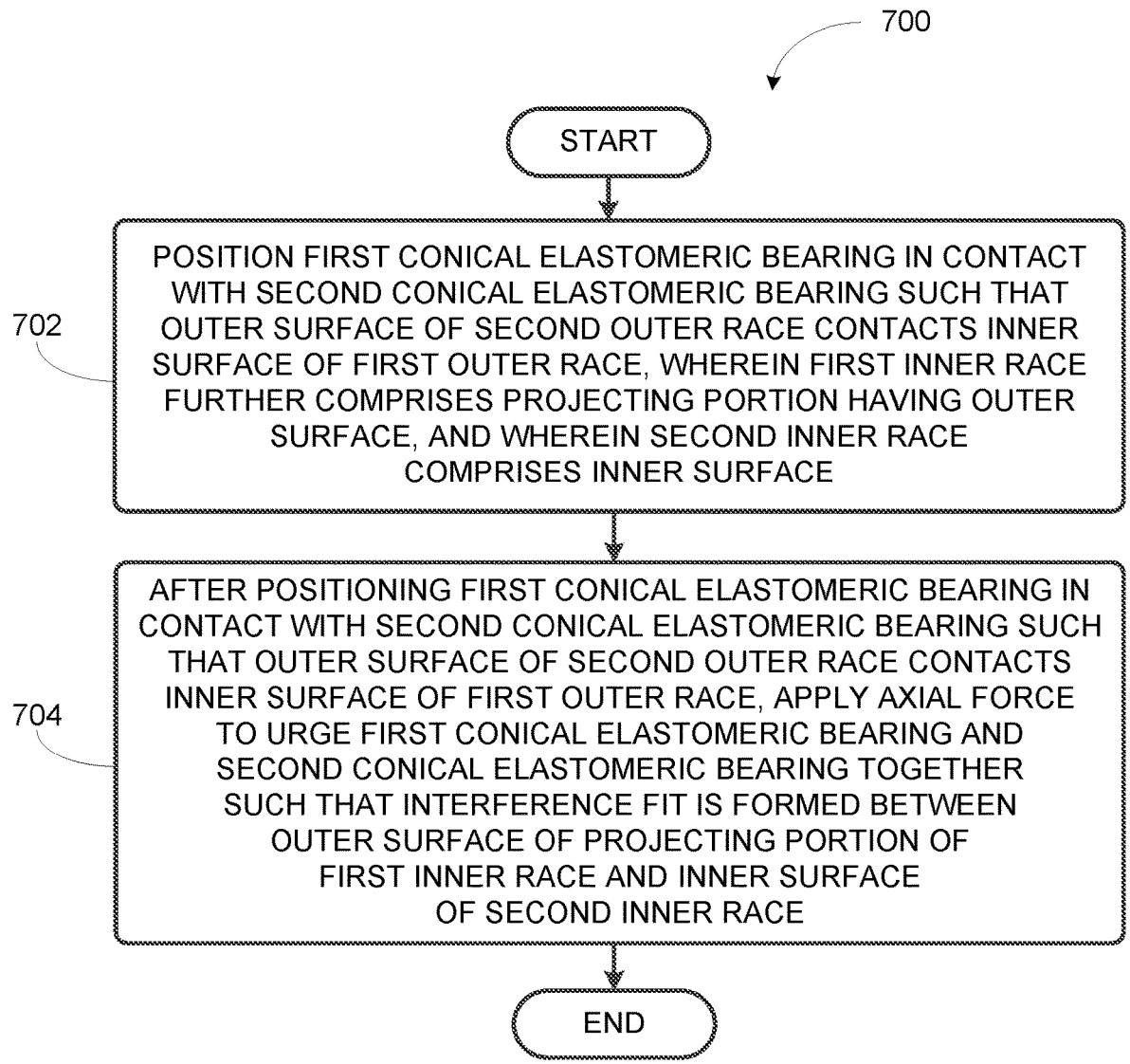
FIG. 7 shows a flowchart of an example method for assembling an opposed conical elastomeric bearing assembly, according to an example implementation.

Turning now to FIG. 6, a flowchart of a method 600 for assembling an opposed conical elastomeric bearing assembly is shown, according to an example implementation. Similarly, FIG. 7 shows a flowchart of a method 700 for assembling an opposed conical elastomeric bearing assembly is shown, according to another example implementation. Methods 600 and 700 shown in FIGS. 6 and 7 present examples of methods that, for instance, could be used with the opposed conical elastomeric bearing assembly 100, as shown in FIGS. 1-5 and discussed herein. It should be understood that for these and other processes and methods disclosed herein, flowcharts show functionality and operation of one possible implementation of present examples. In this regard, each block in a flowchart may represent a module, a segment, or a portion of program code, which includes one or more instructions executable by a processor for implementing or causing specific logical functions or steps in the process. For example, the method 600 or the method 700 may be implemented by one or more computing devices of a robotic assembly system. Alternative implementations are included within the scope of the examples of the present disclosure, in which functions may be executed out of order from that shown or discussed, including substantially concurrently, depending on the functionality involved, as would be understood by those reasonably skilled in the art.

At block 602, the method 600 includes positioning the first conical elastomeric bearing 101 in contact with the second conical elastomeric bearing 104 such that the outer surface 107 of the second outer race 106 contacts the inner surface 108 of the first outer race 103. For instance, FIG. 2 shows an example of the first outer race 103 in contact with the second outer race 106 at block 602. In some implementations, as discussed above, the method 600 may involve applying an adhesive, such as the adhesive 120 indicated in FIGS. 1 and 2, to the outer surface 107 of the second outer race 106, to the inner surface 108 of the first outer race 103, or both, before the outer races are positioned in contact with one another.

As discussed above, the first inner race 102 may include the projecting portion 109, which has an outer surface 110 having an outer diameter 111 and an inner surface 112 forming a bore 113 through the first conical elastomeric bearing 101 in an axial direction 114. In some implementations, as shown in FIG. 2, positioning the outer races in contact with one another may also involve positioning the projecting portion 109 of the first inner race 102 partially within the second inner race 105.

At block 604, the method 600 includes applying an axial force to urge the first conical elastomeric bearing 101 and the second conical elastomeric bearing 104 together. For instance, positioning the positioning the outer surface 107 of the second outer race 106 in contact with the inner surface 108 of the first outer race 103, as discussed at block 602, may involve the application of an axial force between the first conical elastomeric bearing 101 and the second conical elastomeric bearing 104. After the outer races are in contact with each other, as shown in FIG. 2, an axial force may be further applied to urge the first inner race 102 and the second inner race 105 together. For example, the axial force may be applied such that the second inner race 105 is axially displaced, with respect to the second outer race 106, toward the first conical elastomeric bearing 101.

Additionally or alternatively, the axial force may be applied such that the first inner race 102 is axially displaced, with respect to the first outer race 103, toward the second conical elastomeric bearing 104. The axial displacement of both the first inner race 102 and the second inner race 105 can be seen by comparing FIG. 2 with FIG. 3, where it can be seen that the respective outer races do not change positions, yet each inner race is moved toward the other. In some implementations, a first axial displacement of the first inner race 102 with respect to the first outer race 103 may be substantially equal to a second axial displacement of the second inner race 105 with respect to the second outer race 106. Other arrangements are also possible.

Comparing FIG. 2 with FIG. 3, it can also be seen that applying the axial force at block 604 may deform one or both of the first elastomeric ring 118 and the second elastomeric ring 119. This application of the axial force may induce a shear strain in both the first elastomeric ring 118 and the second elastomeric ring 119. Pre-loading the elastomeric rings in this way may produce the desired result of reducing or substantially preventing tensile loads on the first conical elastomeric bearing 101 and the second conical elastomeric bearing 104 during operation.

At block 606, the method 600 includes positioning the second conical elastomeric bearing 104 in further contact with the first conical elastomeric bearing 101 such that the second inner race 105 surrounds the projecting portion 109 of the first inner race 102, and such that a leading edge 115 of the second inner race 105 contacts a shoulder 116 of the first inner race 102, as can be seen in FIG. 3.

In some implementations, as discussed above, the outer surface 110 of the projecting portion 109 may be frictionally engaged with the inner surface 117 of the second inner race 105 with a heavy interference fit, such that further steps are not necessary to complete the assembly of the opposed conical elastomeric bearing assembly 100. In other examples, the outer surface 110 of the projecting portion 109 may be frictionally engaged with the inner surface 117 of the second inner race 105 via an interference fit that has a greater allowance, and does not require as great a force to urge the inner races together. In some cases, the second inner race 105 may surround the projecting portion 109 of the first inner race 102, as shown in FIG. 3, such that the two components are positioned adjacent to one another without a frictional engagement. In such embodiments, the first conical elastomeric bearing 101 and the second conical elastomeric bearing 104 may be maintained in the relative positions shown in FIG. 3, and one or more components of the assembly may be cold-worked to further engage the first conical elastomeric bearing 101 and the second conical elastomeric bearing 104.

Accordingly, at block 608, the method 600 includes, while applying the axial force, deforming the projecting portion 109 of the first inner race 102 such that the outer diameter 111 of the projecting portion 109 is expanded. As a result, the outer surface 110 of the projecting portion 109 may be frictionally engaged with the inner surface 117 of the second inner race 105. For instance, deforming the projecting portion 109 of the first inner race 102 may include drawing a tapered mandrel 121, as shown in FIG. 3, through the bore 113. For example, the narrower end of the tapered mandrel 121 may be inserted via the second inner race 105 and drawn through the bore 113 until the outer diameter of the tapered mandrel 121 engages the projecting portion 109. Continuing to draw the tapered mandrel 121 through the bore 113 with a sufficient force may deform the projecting portion 109, causing its outer diameter 111 to expand, thereby increasing the frictional engagement between the outer surface 110 of the projecting portion 109 and the inner surface 117 of the second inner race 105.

In some cases, deforming the projecting portion 109 in this way may a substantially irreversible process, such that the deformation cannot be reversed. Consequently, the outer surface 110 of the projecting portion 109 may be irreversibly joined with the inner surface 117 of the second inner race 105. As noted above, the examples discussed herein provide one implementation for creating a cold-worked connection between the first conical elastomeric bearing 101 and the second conical elastomeric bearing 104. Other arrangements are also possible, including the deformation of other components on the opposed conical elastomeric bearing assembly 100.

Turning now to FIG. 7, another flowchart is shown illustrating the method 700 for assembling an opposed conical elastomeric bearing assembly, such as the opposed conical elastomeric bearing assembly 100, according to an example implementation.

At block 702, the method 700 includes positioning the first conical elastomeric bearing 101 in contact with the second conical elastomeric bearing 104 such that the outer surface 107 of the second outer race 106 contacts the inner surface 108 of the first outer race 103. As noted above, this arrangement can be seen in FIG. 1. Further, as in previous examples, the first inner race 102 includes the projecting portion 109 having the outer surface 110, and the second inner race 105 includes the inner surface 117.

In some implementation as otherwise discussed herein, the method 700 may include, before positioning the outer races in contact with each other, applying an adhesive, such as the adhesive 120, to one or both of the inner surface 108 of the first outer race 103 and the outer surface 107 of the second outer race 106.

At block 704, the method 700 includes, after positioning the first conical elastomeric bearing 101 in contact with the second conical elastomeric bearing 104 such that the outer surface 107 of the second outer race 106 contacts the inner surface 108 of the first outer race 103, applying an axial force to urge the first conical elastomeric bearing 101 and the second conical elastomeric bearing 104 together. Applying the axial force at block 704 includes forming an interference fit between the outer surface 110 of the projecting portion 109 of the first inner race 102 and the inner surface 117 of the second inner race 105, as discussed in some of the examples above.

In some embodiments, applying the axial force may also include axially displacing the second inner race 105, with respect to the second outer race 106, toward the first conical elastomeric bearing 101 such that the leading edge 115 of the second inner race 105 contacts the shoulder 116 of the first inner race 102. As noted above, this arrangement is shown in FIG. 3.

Additionally or alternatively, applying the axial force to urge the first conical elastomeric bearing 101 and the second conical elastomeric bearing 104 together may also include axially displacing the first inner race 102, with respect to the first outer race 103, toward the second conical elastomeric bearing 104 such that the leading edge 115 of the second inner race 105 contacts the shoulder 116 of the first inner race 102. In some implementations, a first axial displacement of the first inner race 102 with respect to the first outer race 103 may be substantially equal to a second axial displacement of the second inner race 105 with respect to the second outer race 106.

As noted above, applying the axial force to axially displace the first inner race 102 and the second inner race 105 may include deforming the first elastomeric ring 118 and the second elastomeric ring 119. This, in turn may induce a respective shear strain in the first elastomeric ring 118 and the second elastomeric ring 119, which may be desirable for the reasons mentioned above, among other possible reasons.

As discussed previously, the interference fit between the outer surface 110 of the projecting portion 109 of the first inner race 102 and the inner surface 117 of the second inner race 105 may involve a very small allowance, and thus may require a substantial force to urge the first conical elastomeric bearing 101 and the second conical elastomeric bearing 104 together. For instance, applying the axial load may, in some cases, involve applying the axial force of at least 35,000 pounds.

While joining the first conical elastomeric bearing 101 and the second conical elastomeric bearing 104 together in this way may eliminate the need for cold-working portions of the opposed conical elastomeric bearing assembly 100, or providing other means of attachment, such as fasteners, it may prove impractical in some situations. For example, some manufacturing operations may not have the capability to safely apply axial loads of the magnitude discussed herein. Consequently, some examples of the opposed conical elastomeric bearing assembly 100 discussed herein may be formed from a combination of an interference fit between the first conical elastomeric bearing 101 and the second conical elastomeric bearing 104, adhesives as discussed in some of the examples above, and the cold-working of certain portions of the assembly.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated

What is claimed is:

1. A method of assembling an opposed conical elastomeric bearing assembly, wherein a first conical elastomeric bearing includes a first inner race and a first outer race, and wherein a second conical elastomeric bearing includes a second inner race and a second outer race, the method comprising:

positioning the first conical elastomeric bearing in contact with the second conical elastomeric bearing such that an outer surface of the second outer race contacts an inner surface of the first outer race, wherein the first inner race further comprises a projecting portion, the projecting portion comprising an outer surface having an outer diameter and an inner surface forming a bore through the first conical elastomeric bearing in an axial direction;

applying an axial force to urge the first conical elastomeric bearing and the second conical elastomeric bearing together;

positioning the second conical elastomeric bearing in further contact with the first conical elastomeric bearing such that the second inner race surrounds the projecting portion of the first inner race, and such that a leading edge of the second inner race contacts a shoulder of the first inner race; and while applying the axial force, deforming the projecting portion of the first inner race such that the outer diameter of the projecting portion is expanded, wherein the outer surface of the projecting portion is thereby frictionally engaged with an inner surface of the second inner race.

2. The method of claim 1, applying the axial force comprises:
applying the axial force such that the second inner race is axially displaced, with respect to the second outer race, toward the first conical elastomeric bearing.

3. The method of claim 2, wherein applying the axial force such that the second inner race is axially displaced, with respect to the second outer race, toward the first conical elastomeric bearing further comprises:
applying the axial force such that the first inner race is axially displaced, with respect to the first outer race, toward the second conical elastomeric bearing.

4. The method of claim 3, wherein a first axial displacement of the first inner race with respect to the first outer race is substantially equal to a second axial displacement of the second inner race with respect to the second outer race.

5. The method of claim 2, wherein a first elastomeric ring joins the first inner race and the first outer race, wherein a second elastomeric ring joins the second inner race and the second outer race, and wherein applying the axial force such that the second inner race is axially displaced, with respect to the second outer race, toward the first conical elastomeric bearing further comprises:
inducing a shear strain in the second elastomeric ring.

6. The method of claim 1, wherein deforming the first inner race such that the outer diameter of the projecting portion is expanded comprises drawing a tapered mandrel through the bore.

7. The method of claim 1, wherein deforming the first inner race such that the outer diameter of the projecting portion is expanded comprises:
irreversibly joining the outer surface of the projecting portion of the first inner race with the inner surface of the second inner race.

8. The method of claim 1, further comprising:
before positioning the first conical elastomeric bearing in contact with the second conical elastomeric bearing such that the outer surface of the second outer race contacts the inner surface of the first outer race, applying an adhesive to the outer surface of the second outer race.

9. A method of assembling an opposed conical elastomeric bearing assembly, wherein a first conical elastomeric bearing includes a first inner race and a first outer race, and wherein a second conical elastomeric bearing includes a second inner race and a second outer race, the method comprising:

positioning the first conical elastomeric bearing in contact with the second conical elastomeric bearing such that an outer surface of the second outer race contacts an inner surface of the first outer race, wherein the first inner race comprises a projecting portion having an outer surface, and wherein the second inner race comprises an inner surface; and after positioning the first conical elastomeric bearing in contact with the second conical elastomeric bearing such that the outer surface of the second outer race contacts the inner surface of the first outer race, applying an axial force to urge the first conical elastomeric bearing and the second conical elastomeric bearing together such that an interference fit is formed between the outer surface of the projecting portion of the first inner race and the inner surface of the second inner race, and deforming the projecting portion of the first inner race such that the outer diameter of the projecting portion is expanded.

10. The method of claim 9, wherein applying the axial force to urge the first conical elastomeric bearing and the second conical elastomeric bearing together further comprises:
axially displacing the second inner race, with respect to the second outer race, toward the first conical elastomeric bearing such that a leading edge of the second inner race contacts a shoulder of the first inner race.

11. The method of claim 10, wherein applying the axial force to urge the first conical elastomeric bearing and the second conical elastomeric bearing together further comprises:
axially displacing the first inner race, with respect to the first outer race, toward the second conical elastomeric bearing such that the leading edge of the second inner race contacts the shoulder of the first inner race.

12. The method of claim 11, wherein a first axial displacement of the first inner race with respect to the first outer race is substantially equal to a second axial displacement of the second inner race with respect to the second outer race.

13. The method of claim 10, wherein a first elastomeric ring joins the first inner race and the first outer race, wherein a second elastomeric ring joins the second inner race and the second outer race, and wherein axially displacing the second inner race, with respect to the second outer race, toward the first conical elastomeric bearing further comprises:
inducing a shear strain in the second elastomeric ring.

14. The method of claim 9, further comprising:
before positioning the first conical elastomeric bearing in contact with the second conical elastomeric bearing such that the outer surface of the second outer race contacts the inner surface of the first outer race, applying an adhesive to the outer surface of the second outer race.

15. The method of claim 9, wherein applying the axial force to urge the first conical elastomeric bearing and the second conical elastomeric bearing together such that the interference fit is formed between the outer surface of the projecting portion of the first inner race and the inner surface of the second inner race comprises applying the axial force of at least 35,000 pounds.

16. An opposed conical elastomeric bearing assembly comprising:
a first conical elastomeric bearing having a first inner race and a first outer race, wherein the first inner race and the first outer race are joined by a first elastomeric ring positioned therebetween, and wherein the first inner race comprises a projecting portion having an outer surface and an inner surface, the inner surface forming a bore through the first conical elastomeric bearing in an axial direction; and a second conical elastomeric bearing having a second inner race and a second outer race, wherein the second inner race and the second outer race are joined by a second elastomeric ring positioned therebetween, wherein an inner surface of the first outer race is engaged with an outer surface of the second outer race, and wherein the outer surface of the projecting portion of the first inner race is frictionally engaged with an inner surface of the second inner race of the second conical elastomeric bearing, wherein the outer surface of the projecting portion of the first inner race is frictionally engaged with the inner surface of the second inner race of the second conical elastomeric bearing via a radially outward deformation of the outer surface of the projecting portion.

17. The opposed conical elastomeric bearing assembly of claim 16, wherein the inner surface of the first outer race is joined with the outer surface of the second outer race via an adhesive.

18. The opposed conical elastomeric bearing assembly of claim 16, wherein a leading edge of the second inner race contacts a shoulder of the first inner race.

19. The opposed conical elastomeric bearing assembly of claim 16, wherein the first conical elastomeric bearing and the second conical elastomeric bearing are irreversibly joined via the frictional engagement of the outer surface of the projecting portion of the first inner race with the inner surface of the second inner race of the second conical elastomeric bearing.

20. The method of claim 1, wherein applying the axial force to urge the first conical elastomeric bearing and the second conical elastomeric bearing together comprises applying the axial force of at least 35,000 pounds.

* * * * *